United States Patent
Bowell

[15] 3,691,996
[45] Sept. 19, 1972

[54] POULTRY BROODER BURNER HOUSING

[72] Inventor: James P. Bowell, West Saint Paul, Mich.

[73] Assignee: Miller Little, Giant Co., Inc., Dakota, Minn.

[22] Filed: Nov. 20, 1970

[21] Appl. No.: 91,444

[52] U.S. Cl. .................................................. 119/32
[51] Int. Cl. ............................................... A01k 31/18
[58] Field of Search ........ 119/32, 92, 92 B; 126/85 A

[56] References Cited

UNITED STATES PATENTS

| | | |
|---|---|---|
| 3,505,976 | 4/1970 | Miller .......................... 119/32 |
| 2,240,571 | 5/1941 | Olson et al. .................. 119/32 |
| 3,349,752 | 10/1967 | Murphy ........................ 119/32 |
| 3,563,206 | 2/1971 | Hermann ...................... 119/32 |

Primary Examiner—Hugh R. Chamblee
Attorney—Robert M. Dunning

[57] ABSTRACT

A burner housing for a poultry brooder in which a gas burner is suspended in an open framework beneath a ceramic heat deflector. The novelty lies in constructing the open framework with interlocking tabs and bends so that the entire burner housing may be assembled and disassembled without the use of nuts, bolts, or other cumbersome fasteners and with a minimum of tools.

10 Claims, 8 Drawing Figures

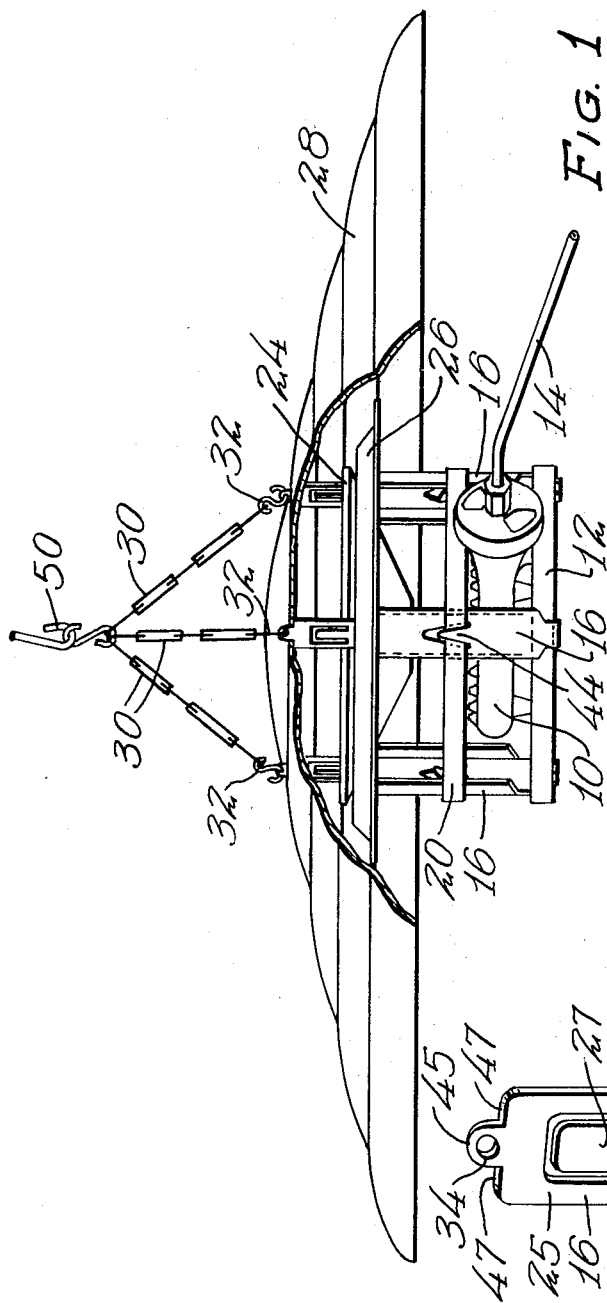
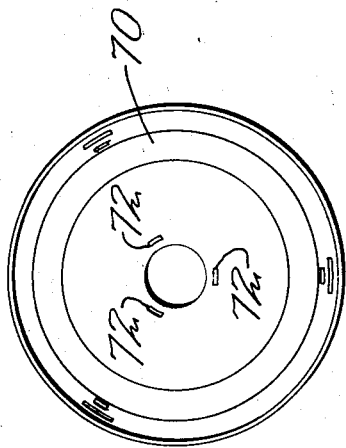
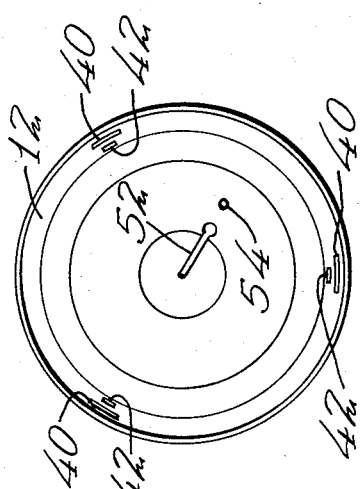
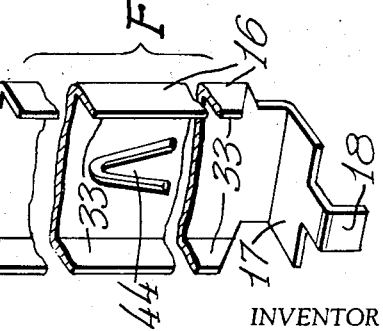
INVENTOR
JAMES P. BOWELL
BY Robert M. Dunning
ATTORNEY INVENTOR
JAMES P. BOWELL
BY Robert M. Dunning
ATTORNEY

POULTRY BROODER BURNER HOUSING

BACKGROUND OF THE INVENTION

In the prior art it has been found preferable to construct poultry brooder burner housings in such a fashion that they may be assembled and disassembled for storage or shipment. Constant shifting around of such apparatus demands that a knockdown capability be incorporated into the brooder housings. However, to achieve this capability prior art devices have had to utilize a large number of parts which are tediously connected together by nuts and bolts. The assembly and disassembly are tedious and time consuming and therefore wasteful of energies and uneconomic. Furthermore, since burner housings of this sort often operate in nonfavorable environments the nuts and bolts usually get rusty and difficult to work with. As a result more time is lost struggling with the assembly and disassembly and searching for replacement nuts and bolts. The present invention avoids these difficulties as discussed below.

SUMMARY OF THE INVENTION

My invention contemplates a poultry brooder burner housing in which the various parts comprising the supporting assembly are constructed with interlocking tabs, bends, and slots so that the entire housing may be assembled into a rigid structure without the use of any nuts, bolts or other fasteners. The design is such that all parts lock together with a minimum of effort and little or no need of tools. The design is advantageous in that disassembly is as quick and easy as assembly and here again little or no tools are required. It may thus be seen that it is an object of my invention to provide a poultry brooder burner housing which can be easily assembled and disassembled, by one person, in a minimum of time, using no bolts, nuts or other fasteners. Further objects and advantages will become apparent upon consideration of the following description and drawings.

BRIEF DESCRIPTION OF THE DRAWINGS

FIG. 1 is a partially cut away side view of the entire assembled poultry brooder burner housing.

FIG. 3 is a detailed plan view of the bottom platform supporting the gas burner.

FIG. 4 shows in perspective a detailed view of one of the upright members to better show the interlocking tabs and bends.

FIG. 7 is a plan view showing another possible platform which can be used at the bottom of the framework for supporting a different type of burner.

DESCRIPTION OF THE PREFERRED EMBODIMENT

Figure 2:
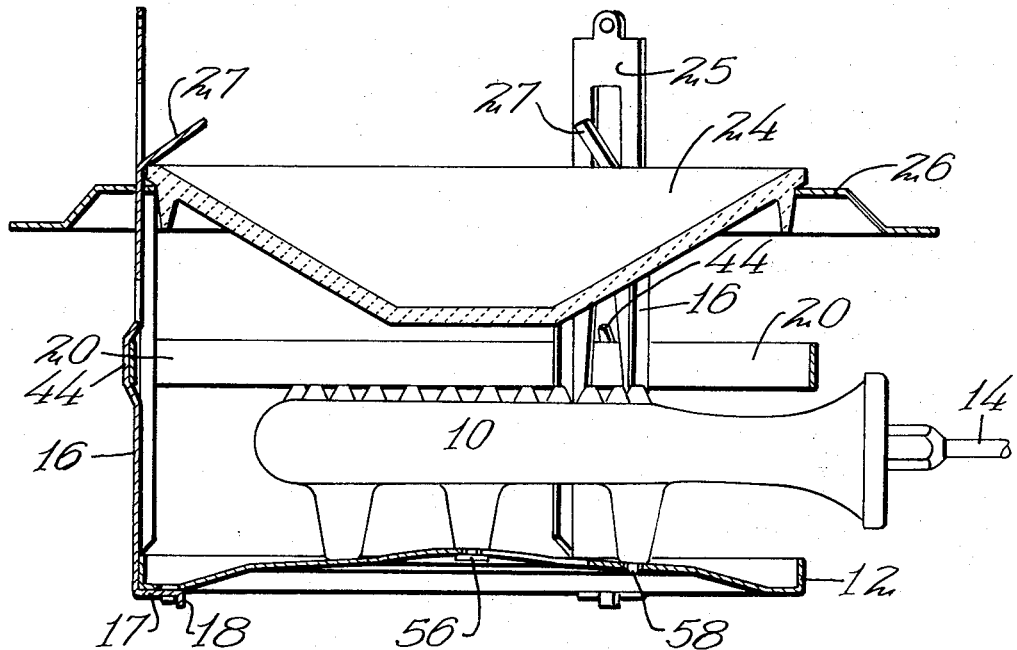
FIG. 2 is a sectional side view of just the inner framework and deflector shield showing the position of the gas burner therein and having one of the upright members removed for clarity.

Referring to FIG. 1 the entire assembled brooder burner housing may be seen with part of the canopy cut away so as to provide a better view of the internal gas burner supporting frame. A typical burner 10 is supported on a platform 12 which in turn is carried by three identical upright members 16. Gas is supplied to burner 10 through a pipe 14 in a conventional manner well known to those skilled in the art. Any type of oil or gas burner or other heating element may be used in the present invention and no limitation is intended by the showing of the burner in the drawing. The burners shown are examplary only and intended only to show the advantages of the interlocking construction of the supporting frame. Simultaneous reference should be had to FIG. 2 which shows this framework assembly in section and in greater detail. As can be seen in FIG. 2 the upright members 16 are connected to platform 12 simply by inserting them through a first slot in platform 12 which is radially farther from the center and then back through a second slot in platform 12 which is slightly closer to the center. The exact configuration of the upright member 16 is shown in detail in FIG. 4.

In FIG. 4 it may be seen that upright member 16 is provided with a first bent portion 17 and a second bent tab portion 18 which is narrower than the first portion 17. Platform 12 is shown in detail in FIG. 3 and the radially spaced slots therein can be seen to correspond to bent portions 17 and 18 in width. In FIG. 3 the outer wider slots are designated by the numeral 40 while the narrower inner slots are designated by the numeral 42. The two bends 18 and 17 at the bottom of upright member 16 are inserted through slot 40 from the bottom of platform 12 and the narrow bent portion 18 is then inserted through slot 42 from the top of platform 12. It can be seen that as member 16 is then brought into an upright perpendicular position with respect to platform 12 that some deformation of the base is necessary. This is advantageous in that upright member 16 is therefore mounted under tension and wrapped around the outside circumference of platform 12. Referring again to FIG. 1 it may be seen that upright members 16 are held in an upright position and prevented from springing outward by an annular ring 20 which surrounds all three of the upright members. A set of small tabs 44 are punched in each of the upright members 16. Tabs 44 may be bent out manually to accept ring 20. As can be seen in FIG. 2, once ring 20 is inserted underneath a tab 44 the top portion of the tab may be bent back in toward member 16 to insure that ring 20 does not come loose. Ring 20 is also provided with interlocking connectors at its ends as can be seen in FIG. 5.

Figure 5:
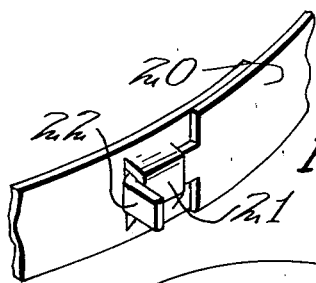
FIG. 5 is a detailed view of a portion of the circumferential ring in the framework demonstrating the interlocking connection therein.
Figure 6:
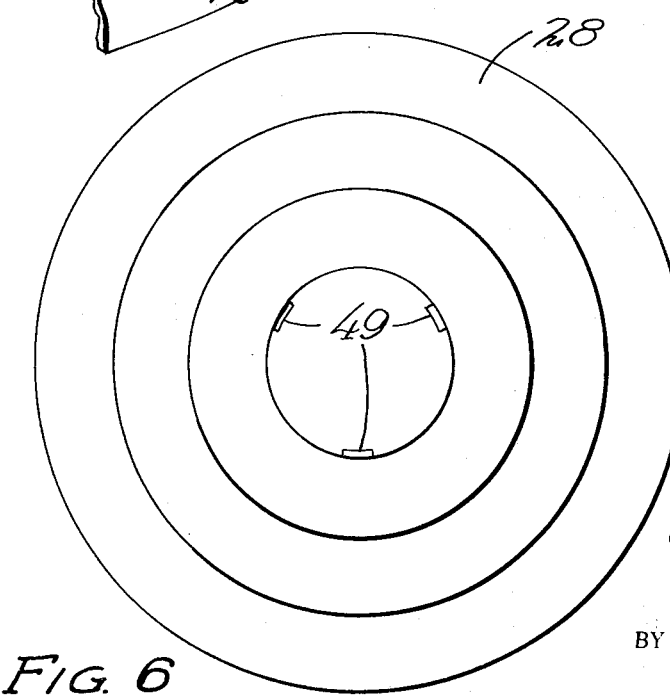
FIG. 6 is an overhead view of the canopy covering the top of the burner housing demonstrating the position of the upright accepting slots therein.

In FIG. 5 it may be seen that one end of ring 20 is narrowered down into a tab extension 22. The other end of ring 20 has a punched out section 21 under which tab 22 can be slid and bent outward. This locks ring 20 into a circular configuration permitting it to be slid down over the three upright members and into engagement with tabs 44. As is well known in the art, ring 20 also serves the function of preventing the poultry, which may be small chicks or the like, from walking into the burner section and injuring themselves.

In order to spread the heat evenly in all directions a ceramic cone shaped heat deflector 24 is employed which is supported about its circumference by an annular ring 26 which may be seen most clearly in FIGS. 1 and 2. Circumferential or annular ring 26 is supported near the top of each of the upright members 16. Turning again to FIG. 4 it may be seen that the top portion of upright member 16 is narrowered down somewhat to provide a pair of shoulders 31. In addition, the sides of upright member 16 designated in FIG. 4 by the numeral 33 do not extend above this point so that shoulder 31 is increased in size. Sides 33 are provided on upright member 16 so as to afford additional strength and stiffening to the upright member. Three circumferentially spaced slots in circumferential or annular ring 26 accept the top narrow portion 25 of upright member 16 therethrough. Circumferential ring 26 thus rests on shoulders 31. Ceramic heat deflector 24 then of course rests on ring 26 and both the deflector and the ring are held securely in place by bending a set of tabs 27 inward as shown in FIG. 2.

The very top of upright members 16 is provided with another small additional extension 45 so as to create a pair of shoulders 47. Extension 45 is inserted through a set of three slots 49 in canopy 28. Thus, canopy 28 can rest on shoulders 27 at a slight distance above heat deflector 24. A set of holes 34 are provided in extension 45 to permit the attachment of three hooks 32 which are in turn connected to a set of chains 30 and an overall support hook 50 so that the entire brooder burner housing assembly may be supported from above. Reference should be had to FIG. 1.

As can be seen from the drawings and description to this point, absolutely no fasteners, nuts or bolts are necessary in the assembly and disassembly of my invention. The unique features of the upright members 16, which include shoulders, tabs, and bent portions, permits the whole framework assembly which supports the burner to be assembled and the canopy and heat deflector to be inserted thereupon without resorting to fasteners of any sort. This novel concept, of course, need not be limited to the particular and specific arrangements of tabs, shoulders and bends shown in the drawings but may vary widely within the spirit and scope of the invention. For example, reference to FIG. 3 will show a small keyway slot 52 and a hole 54 in platform 12. In FIG. 2 it may be seen that a small foot 56 is formed on the bottom of one leg of burner 10 and a small extension 58 is formed on the bottom of a different leg of burner 10. This permits the burner to also be mounted on platform 12 without the use of any nuts, bolts or fasteners. Foot 56 is simply inserted into the hole at the end of keyed slot 52 and slid into the narrow portion to lock the burner in place. Extension 58 then drops into hole 54 assuring that burner 10 may not retract out of the slot nor rotate from its position. However, this arrangement is only one of many which could be used within the scope of the present invention.

Figure 8:
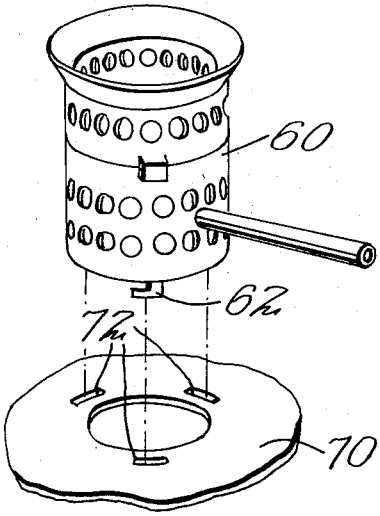
FIG. 8 demonstrates another possible burner which could be used in conjunction with the platform of FIG. 7.

Another possibility is shown in FIG. 8 in which a flame holder 60 is depicted. This type of flame holder is well known to those skilled in the art and comprises another variation which could well be used with the present invention. Flame holder 60 has three pairs of feet 62 which permit flame holder 60 to be mounted by dropping it down into three corresponding slots and imparting a slight rotation to flame holder 60. The type of platform base that would be used with this burner is shown in FIG. 7. In FIG. 7 a platform 70 is shown which is similar in most respects to platform 12 except that three radially spaced slots 72 are substituted for the keyway slot 52 and hole 54 shown in FIG. 3.

The above variations in burners are only one of the many possible variations that may be used. Similar modifications could be made to the upright and circumferential members and since all variations cannot be practicably discussed here the following claims are presented to define the invention in its proper scope.

I claim:

1. In a poultry brooder burner housing of the type wherein a heating element is mounted in an open framework beneath a heat deflector, said framework comprising a platform suspended from upright members connected together by circumferential means and said deflector being supported about its edge by the circumferential means, and wherein a canopy is disposed above the deflector to further disperse the heat, the improvement comprising a first set of interlocking tabs and bends on the bottom of said upright members of said open framework designed to engage slots in said platform, a second set of tabs extending from the middle of said upright members and adapted to bend partially about and secure said circumferential means, and extended tabs at the top of said upright members adapted to be insertable in slots in said canopy so that said housing may be completely assembled without any separate fasteners.

2. The brooder housing of claim 1 in which the heating element is mounted on said platform by an interlocking tab on said heating element inserted into an interlocking opening in said platform.

3. The brooder housing of claim 1 in which each of said upright members has a pair of bends at its lower end and said platform has a pair of radially spaced slots positioned to accept each pair of said bends, the first bend being inserted through the slot closer the edge of the platform and the remaining bend through the other slot.

4. The brooder housing of claim 1 in which said circumferential means comprises a pair of annular members positioned at spaced intervals along said upright members, the upper annular member supporting said deflector about its perimeter and the lower annular member providing structural support to said upright members.

5. The brooder housing of claim 4 in which said upright members have a pair of progressively narrower portions at the top creating two sets of shoulders, said canopy resting on the upper shoulders and said upper annular member resting on the lower shoulders.

6. The brooder housing of claim 5 in which each of said upright members has a pair of bends at its lower end and said platform has a pair of radially spaced slots positioned to accept each pair of said bends, the first bend being inserted through the slot closer the edge of the platform and the remaining bend through the other slot.

7. The brooder housing of claim 6 in which the heating element is mounted on said platform by an interlocking tab on said heating element inserted into an interlocking opening in said platform.

8. The brooder housing of claim 6 in which said deflector is locked tightly against said lower shoulders by a tab in said upright members bent over the edge of said deflecting shield.

9. The brooder housing of claim 8 in which said lower annular member is locked to said upright members by tabs in said upright members bent over said lower annular member.

10. In a poultry brooder burner housing of the type wherein a heating element is mounted in an open framework beneath a heat deflector, said framework comprising a platform suspended from upright members connected together by circumferential means and said deflector being supported about its edge by the circumferential means, and wherein a canopy is disposed above the deflector to further disperse the heat, the improvement comprising a set of interlocking tabs and bends on the bottom of said upright members of said open framework designed to engage slots in said platform, additional tabs and shoulders on said upright members to engage the circumferential means and the canopy so that said housing may be completely assembled without any separate fasteners.

* * * * *